United States Patent
Fukuchi et al.

[11] 3,872,161
[45] Mar. 18, 1975

[54] PROCESS FOR THE MANUFACTURE OF ALKYLAMINOALKYL ACRYLATES

[75] Inventors: Shuzo Fukuchi; Noboru Shimizu, both of Osaka; Takashi Ohara, Nishinomiya, all of Japan

[73] Assignee: Nippon Shokubai Kagaku Kogyo Co. Ltd., Osaka, Japan

[22] Filed: Mar. 2, 1973

[21] Appl. No.: 337,421

[30] Foreign Application Priority Data
Mar. 6, 1972   Japan............................ 47-022239

[52] U.S. Cl............................................ 260/486 R
[51] Int. Cl............................................ C07c 69/54
[58] Field of Search................................ 260/486 R

[56] References Cited
UNITED STATES PATENTS
| | | | |
|---|---|---|---|
| 2,342,463 | 2/1944 | Fisher et al. | 260/476 |
| 2,465,319 | 5/1949 | Whimfield | 260/75 |
| 2,662,093 | 12/1953 | Billica | 260/475 |

Primary Examiner—Lorraine A. Weinberger
Assistant Examiner—Paul J. Killos
Attorney, Agent, or Firm—Armstrong, Nikaido & Wegner

[57] ABSTRACT

A process is described for the manufacture of alkyl aminoalkyl acrylates of the general formula:

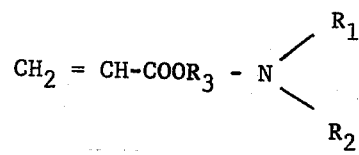

using selected zinc compounds or metallic zinc as a catalyst.

$R_1$ represents hydrogen atom or alkyl group containing 1 to 8 carbon atoms, $R_2$ represents alkyl group containing 1 to 8 carbon atoms, in case of $R_1$ being hydrogen atom, $R_2$ represents tert-alkyl group containing 4 to 8 carbon atoms and $R_3$ represents straight or branched alkylene group containing 2 to 4 carbon atoms. The alkyl aminoalkyl acrylates of the invention are prepared by reacting an alkyl acrylate of the general formula:

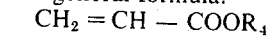

wherein $R_4$ represents alkyl group containing 1 to 4 carbon atoms with an alkyl aminoalkanol of the general formula:

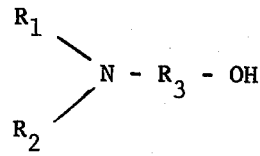

wherein $R_1$, $R_2$ and $R_3$ have the same meanings as mentioned above, in the presence of the zinc or zinc compound catalyst.

30 Claims, No Drawings

PROCESS FOR THE MANUFACTURE OF ALKYLAMINOALKYL ACRYLATES

This invention relates to a process for the manufacture of alkylaminoalkyl acrylates. More particularly, it relates to a process for the manufacture of alkylaminoalkyl acrylates in a high yield wherein the transesterification of a lower alkyl acrylate with alkylaminoalkanol is carried out in the presence of a zinc compound as catalyst.

The alkylaminoalkyl acrylates are very useful as specific cationic monomers and starting material for polymers and, in particular, dimethylaminoethyl acrylate is a compound noticed recently as monomer for the copolymer.

The alkylaminoalkyl acrylate or methacrylates have been hitherto produced generally by the transesterification of a lower alkyl acrylate or methacrylate with alkylaminolkanol.

In general, such kind of transesterification proceeds according to the following equation (I):

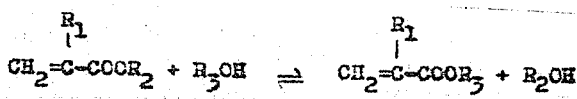

(I)

wherein $R_1$ represents H or $CH_3$, $R_2$ represents alkyl group containing 1 to 4 carbon atoms and $R_3$ represents alkylaminoalkyl group. However, since the reaction of the equation (I) is the equilibrium reaction, the lower alcohol $R_2OH$ formed should be removed out of the reaction system to advance the transesterification. Moreover, in the transesterification according to the equation (I), side reactions as shown in the equation (II) and (III), such as the addition of the alcohol to the double bond and polymerization, are apt to take place.

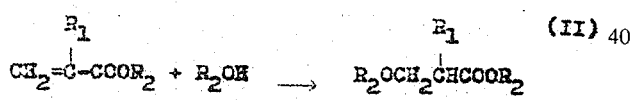

(II)

(III)

wherein $R_1$, $R_2$ and $R_3$ have the same meanings as mentioned above. The use of catalysts having a low selectivity in the transesterification of the alkyl acrylate or methacrylate with alkylaminoalkanol provides a large amount of an alkoxy propionate and an alkylaminoalkoxy propionate or alkoxy isobutylate and alkylaminoalkoxy isobutylate formed as by-products resulting in the reduced yield of the desired alkylaminoalkyl acrylates or methacrylates.

In the case of the transesterification of alkyl acrylate, the addition reactions of the alcohol to the double bond are apt to take place as compared with of alkyl methacrylate. Moreover when an alkylaminoalkanol is used as alcohol ($R_3OH$ in the equation (I)), the reaction system becomes basic so that said addition reactions are accelerated. Particularly, among of alkylaminoalkanols, dimethylaminoethanol is so strong in alkalinity that it is very difficult to surpress said side reactions and to produce the dimethylaminoethyl acrylate in a high yield.

It has also been well known to use various metal compounds as catalysts in transesterification reactions. But these catalysts do not always show a high performance for the transesterification of esters having a double bond, such as alkyl acrylate, particularly for the transesterification of alkyl acrylate with alkylaminoalkanol.

There has been proposed catalysts for the transesterification of acrylate or methacrylate with alcohol, that is, alkali metal (British Pat. No. 820,560), alkali metal phenolate compounds (British Pat. No. 976,304), di-n-butyltin oxide (British Pat. No. 1,244,576) and oxide and hydroxide of manganese or calcium (Dutch Pat. Application No. 7102671). But all of these catalysts are only effective for the transesterification of alkyl methacrylate.

As above mentioned, in the transesterification of acrylate or methacrylate, the addition reaction to the double bond as well as the polymerization of starting ester or formed ester as described above other than the main transesterification take place and it was not foreseeable which catalysts among known metal compound catalysts are effective for the transesterification of the alkyl acrylate or methacrylate with the alkylaminoalkanol and have a high selectivity by surpressing the addition and polymerization as side reaction.

On the other hand, the aluminum alcoholate catalyst is proposed for the transesterification of alkyl acrylate with alkylaminoalkanol (JACS, 81, 3618 (1959)), but there are disadvantages that the reaction rate is low due to its low activity, the removal of water present in the reagents before the addition of the catalyst is required to retain the activity of catalyst and that the catalyst itself used is expensive.

And the mixed catalyst comprising the polybutyltitanate and lithium hydroxide for the transesterification of this invention is mentioned in British Pat. No. 1,155,897, and in which relatively high yield is described. But this mixed catalyst has many drawbacks in the industrial use. Firstly, the preparation of the catalyst is so complicated that it is very difficult to prepare the catalyst compounds with good reproducibility. Secondly, this catalyst must be continuously handled on account of its sensitive properties and then this catalyst is very expensive.

As mentioned above, as to the catalysts for the transesterification of the alkyl acrylate or methacrylate with the alkylaminoalkanol, there are required other than in the first place a high selectivity, the maintenance of activity for a long period and the low cost.

Accordingly, an object of this invention is to provide an improved process for the manufacture of alkylaminoalkyl acrylates.

Another object of this invention is to provide an improved process in the transesterification of a lower alkyl acrylate with an alkylaminoalkanol.

A still another object of this invention is to provide a new catalyst to be used for the transesterification of a lower alkyl acrylate with an alkylaminoalkanol.

Another object of this invention is to provide a catalyst having a high selectivity and high activity for the production of alkylaminoalkyl acrylates.

A still other object of this invention is to provide a catalyst, the activity of which can be maintained for a long period and which is low cost.

According to this invention, alkylaminoalkyl acrylates of the general formula:

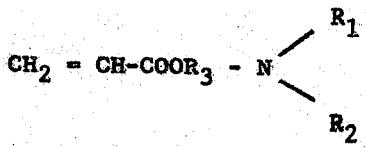

wherein $R_1$ respresents hydrogen atom or alkyl group containing 1 to 8 carbon atoms, $R_2$ represents alkyl group containing 1 to 8 carbon atoms, in case of $R_1$ being hydrogen atom, $R_2$ represents tert-alkyl group containing 4 to 8 carbon atoms and $R_3$ represents straight or branched alkylene group containing 2 to 4 preferably 2 or 3, carbon atoms, are manufactured by reacting an alkyl acrylate of the general formula:

$CH_2 = CH - COOR_4$ wherein $R_4$ represents alkyl group containing 1 to 4 carbon atoms, with an alkylaminoalkanol of the general formula:

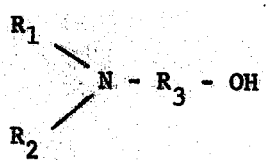

wherein $R_1$, $R_2$ and $R_3$ have the same meanings as mentioned above, in the presence of a catalytic amount of a zinc compound.

By using the zinc compound catalyst according to this invention, the desired alkylaminoalkyl acrylate can be produced in a high yield, because alkoxy propionate caused by side reaction is not formed substantially, compared with using the catalyst such as alkali metal alcoholate. Moreover, a great feature in the process according to this invention consists in that the by-product is not formed substantially during the reaction so that the separation and purification of reaction product may be accomplished by a simple distillation operation and an ester of high quality may be obtained. Further, there is a great advantage is industry that alkoxy propionate, which is separated difficultly, is not found substantially in the mixture of lower alcohol and starting ester recovered from the reaction system so that it may be used again after the only single separation of lower alcohol. Furthermore, the zinc compound catalyst in this invention maintains a high preformance for a long period of time, so that the catalyst could be used repeatedly.

As the alkyl acrylates to be used in this invention, there are mentioned methyl acrylate, ethyl acrylate, n-propyl acrylate, isopropyl acrylate, n-butyl acrylate, isobutyl acrylate, sec-butyl acrylate and tert-butyl acrylate.

As typical alkylaminoalkanols, there are mentioned dimethyl aminoethanol, diethyl aminoethanol, dipropyl aminoethanol, dibutyl aminoethanol, dipentyl aminoethanol, dihexyl amino-ethanol, dioctyl aminoethanol, methylethyl aminoethanol, methylpropyl aminoethanol, methylbutyl aminoethanol, methylhexyl amincethanol, methyloctyl aminoethanol, ethylpropyl aminoethanol, ethylbutyl aminoethanol, ethylpentyl aminoethanol, ethloctyl aminoethanol, propylbutyl aminoethanol, tert-butyl aminoethanol, tert-pentyl aminoethanol, tert-hexyl aminoethanol, tert-heptyl aminoethanol, tert-octyl aminoethanol, dimethyl aminopropanol, diethyl aminopropanol, dibutyl aminopropanol, dibuty aminopropanol, dioctyl aminopropanol, methylethyl aminopropanol, butylpentyl aminopropanyl, tert-butyl aminopropanyl, tert-pentyl aminopropanol, tert-octyl aminopropanol, dimethyl aminoisopropanol, diethyl aminoisopropanol, dibutyl aminoisopropanol, dioctyl aminoisopropanol, propylbutyl aminoisopropanol, tert-butyl aminoisopropanol, tert-octyl aminoisopropanol, dimethylaminobutanol, diethylaminobutanol, dipropylaminobutanol, dioctylaminobutanol, tert-octylaminobutanol and the like.

As typical zinc compounds to be used as catalyst in this invention, there are mentioned zinc hydroxide; zinc sulfide; inorganic acid salts such as zinc chlroide, zinc bromide, zinc iodide, zinc fluoride, basic zinc chloride, zinc nitrate, basic zinc nitrate, zinc sulfate, basic zinc sulfate, zinc sulfite, zinc phosphate, zinc pyrophosphate, zinc carbonate, basic zinc carbonate, zinc cyanide zinc thiocyanate, zinc borate, zinc iodate, zinc silicate, zinc chromate, zinc tungstate, zinc titanate, zinc aluminate, zinc ammonium chloride, zinc potassium sulfate and zinc fluorosilicate; zinc oxide; metallic zinc; organic acid salts such as zinc formate, zinc acetate, zinc propionate, zinc butyrate, zinc stearate, zinc oxalate, zinc succinate, zinc acrylate, zinc methacrylate, zinc maleate, zinc citrate, zinc lactate, zinc tartarate, zinc benzoate, zinc phthalate, zinc p-phenol sulfonate, zinc phenolate, zinc naphthenate and zinc octenate; alkyl zinc compounds such as dimethyl zinc, diethyl zinc, diisopropyl zinc, di-n-butyl zinc, methyl zinc chloride and ethyl zinc chloride; zinc alkoxides such as zinc methoxide, zinc ethoxide, zinc isopropoxide, zinc butoxide and zinc bis-(dimethylaminoethoxide); zinc chelate compounds such as zinc acetylacetonate, zinc isopropoxide acetoacetonate, zinc ethyl acetoacetate and zinc ethylenediaminetetracetate; and zinc carbamates such as zinc dimethyl dithiocarbamate, zinc diethyl dithiocarbamate, zinc di-n-butyl dithiocarbamate and the mixture of metallic zinc or zinc oxide with reagents such as acid or alkali to form zinc compounds or complexes.

These zinc compounds are used alone as the catalyst for the transesterification according to this invention and, of course, act effectively as a mixture of more than two of them. Further, the compounds which are apt to form the adduct with the starting aminoalkanol, such as zinc halide and nitrate, can display a very excellent catalytic performance if they are added after the adduct is formed previously.

In an embodiment, for example, from the viewpoint of operation in which zinc halide is hydgroscopic or zinc nitrate is easily molten and solidified, the adduct of zinc halide or zinc nitrate with alkylaminoalkanol is formed previously and then introduced into the reaction system. The alkylaminoalkanol, which is used for this purpose, is preferably identical to that which is used for the transesterification, in order to avoid the undesired contamination of the end product.

The formation of the adduct of alkylaminoalkanol with zinc halide or nitrate is observed by the fact that, for example, alkylaminoalkanol and zinc halide or nitrate are dissolved respectively in a suitable solvent, e.g. ether or methanol, and then mixed each other to separate a white precipitate. Even if zinc halide or nitrate is added to alkylaminoalkanol, a part thereof is readily converted into the alkylaminoalkanol-zinc halide or nitrate addition compound, so that the catalyst in such a form may be introduced into the reaction system.

The amount of catalyst used in the process according to this invention may vary within a wide range of 0.01 to 30 mol% to the alkylaminoalkanol as starting material and is preferably 0.05 to 20 mol%, and most preferably 0.5 to 15 mol%. That is, a catalyst amount of less than 0.01 mol% to the alcohol requires an insignificantly long reaction time and a catalyst amount of more than 30 mol% makes difficult the separation of product.

It is characteristic that the catalyst can be re-used in the process according to this invention. Namely, the starting materials other than catalyst can be introduced into the residue, from which the product has been separated after the completion of transesterification, to make it again take part in the transesterification.

As means for separating catalyst, any desired method, such as the filtration or distillation of reaction liquid, may be selected. In this manner, the repeated use of the catalyst separated from the reaction liquid reduces the cost of catalyst to a great extent, so that it may be especially advantageous in the industrial production.

Not only anhydrous but hydrous zinc compound, the latter being accessible industrially at a low cost, can be used as catalyst and those containing water of crystallization, such as zinc nitrate hexahydrate, as well as industrial products having a little water content can be also used.

The reaction according to this invention may be carried out at a temperature within a range of 30° to 170°C, preferably 40° to 130°C. That is to say, the reaction rate at a temperature below 30°C is small and, on the other hand, at a temperature above 170°C, the addition reaction to the double bond of alcohol is apt to take place and the polymerization of the starting ester as well as the ester formed is occurred resulting in an extremely reduced yield. Therefore, when the temperature of reaction mixture will be raised, it is preferred to perform the reaction under a reduced pressure.

The reaction is carried out, in general, preferably in the presence of small amount of polymerization inhibitor. The amount of said inhibitor used is in general 0.001 to 5%, preferably 0.01 to 2 % by weight relative to the lower alkyl acrylate. As typical polymerization inhibitors, there are mentioned hydroquinone, hydroquinone monomethyl ether, phenol, tert-butyl cathecol, pyrogallol, β-naphthol, p-benzoquinone, phenothiazine, methylene blue, p-hydroxy diphenylamine, p-phenylene diamine, diphenylamine, phenyl p-naphthyl amino and the like.

The lower alkyl acrylate provided as the starting materials may be used within a wide range of 0.5 to 20 mols per mol of alkylaminoalkanol, and preferably within a range of 1.2 to 6 mols.

In general, the reaction is carried out with distilling off the by-produced lower alcohol and, after the completion of reaction, the distillation is carried out under atmospheric or reduced pressure to separate and remove the unreacted lower alkyl acrylate and, if any, unreacted alkylaminoalkanol resulting in alkylaminoalkyl acrylate. The reaction according to this invention may be of course carried out in either batch or continuous process. And the reaction in this invention is also carried out by using an entraining agent such as cyclohexane, benzene, hexane, petroleum hydrocarbon and the like, which form an azeotropic mixture with lower alcohol prepared in the transesterification.

The yield of ester in the following examples is expressed by the theoretical yield referred to the starting alkylaminoalkanol provided.

EXAMPLE 1

129.0 g of methyl acrylate, 44.5 g of dimethyl aminoethanol, 0.36 g of phenothiazine as polymerization inhibitor and 2.72 g of zinc chloride as catalyst were placed in a three-necked flask equipped with a stirrer, a thermometer and a distillation column packed with McMahon packings. The mixture was heated at a temperature of 83°C and the methanolmethyl acrylate azeotropic mixture being distilled from the distillation column was distilled off at a top temperature of 62° to 64°C. After 10 hours, the transesterification was completed when the temperature of reaction liquid reached to 97°C, the resulting mixture was distilled in a distillation column packed with McMahon packings to distill off first methyl acrylate and then unreacted dimethyl aminoethanol, and then under a pressure of 6 mm-Hg to yield 59.3 g of 47° to 48°C-fraction. The analysis of the resulting product by the infrared absorption spectrum method (IR method), the gas chromatography (GC method) and the nuclear magnetic resonance spectrum method (NMR method) revealed that it was dimethyl aminoethyl acrylate. The yield of dimethyl aminoethyl acrylate was 82.7% relative to the starting alcohol.

The distillation residue could be used again as the transesterification catalyst.

EXAMPLE 2

13.6 g of zinc chloride and 17.9 g of dimethyl aminoethanol were dissolved in 50 ml of ether respectively. Both solutions were mixed at room temperature, the resulting white sticky mass was separated and the ether was removed under a reduced pressure to yield 24.0 g of dimethyl aminoethanol-zinc chloride adduct. A half amount (12.0 g) thereof was used instead of the zinc chloride in Example 1 and the transesterification was carried out for 8 hours to yield 56.2 g of dimethyl aminoethyl acrylate. The yield was 78.4 % referred to the starting alcohol. The distillation residue could be used again as the transesterification catalyst.

EXAMPLE 3

In the process as described in Example 1, 3.5 g of basic zinc carbonate was used instead of zinc chloride, followed by the same prodecure, to yield 66.1 g of dimethyl aminoethyl acrylate after 9 hours of transesterification. The amount corresponded to a yield of 92.4 %.

129.0 g of methyl acrylate and 44.5 g of dimethyl aminoethanol were added to the resulting distillation residue and the same transesterification as mentioned above was carried out for 7.5 hours to yield 65.2 g of dimethyl aminoethyl acrylate. The amount corresponded to a yield of 91.0 %.

129.0 g of methyl acrylate and 44.5 g of dimethyl aminoethanol were added further to the resulting distillation residue and the same transesterification as mentioned above was carried out for 6 hours to yield 65.7 g of dimethyl aminoethyl acrylate. It corresponded to a yield of 91.8 %.

The resulting distillation residue could be used again as the transesterification catalyst.

EXAMPLES 4 to 22

129.0 g of methyl acrylate, 44.5 g of dimethyl aminoethanol, 0.36 g of phenothiazine and a catalyst listed in the Table 1 were placed in the same apparatus as described in Example 1, reacted at a temperature of 83° to 97°C. The methanol was distilled off at a top temperature of 62° to 64°C in the same manner as in Example 1 as the methanol-methyl acrylate azeotropic mixture and dimethyl aminoethyl acrylate was recovered. The result is shown as in the Table 1.

ethanol, 0.47 g of hydroquinone and 2.55 g of zinc dimethoxide were placed in the same apparatus as described in Example 1, reacted at a temperature 83° to 93°C. The methanol was distilled off at a top temperature of 62° to 64°C for 5 hours to yield 64.3 g of dimethylaminoethyl acrylate. The yield was 89.8% referred to the starting alcohol. The distillation residue could be used again as the transesterification catalyst.

EXAMPLES 24 to 27

1.5 mols of methyl acrylate, 0.5 mols of alkyl aminoalkanol listed in the Table 2, 0.36 g of phenothiazine and 2.9 g of basic zinc carbonate were placed in the

TABLE 1

| Example | Catalyst | (g) | Reaction Time(hrs) | Yield of Ester(%) |
|---|---|---|---|---|
| 4 | zinc bromide | 4.50 | 10.5 | 83.6 |
| 5 | zinc iodide | 6.38 | 11.0 | 82.0 |
| 6 | zinc nitrate | 7.4 | 7.0 | 80.2 |
| 7 | zinc chloride / zinc nitrate | 1.3 / 3.0 | 9.0 | 81.2 |
| 8 | zinc hydroxide | 4.96 | 8.0 | 81.3 |
| 9 | zinc carbonate | 6.27 | 6.0 | 91.3 |
| 10 | zinc formate | 5.76 | 10.0 | 86.0 |
| 11 | zinc borate | 4.67 | 11.0 | 84.7 |
| 12 | zinc chromate | 6.75 | 10.0 | 79.4 |
| 13 | zinc acetate | 6.65 | 13.0 | 79.0 |
| 14 | zinc stearate | 9.54 | 10.5 | 81.0 |
| 15 | zinc oxalate | 5.68 | 11.0 | 78.5 |
| 16 | zinc acrylate | 5.18 | 8.5 | 83.1 |
| 17 | zinc p-phenol sulfonate | 5.54 | 11.0 | 80.4 |
| 18 | zinc sulfide | 2.90 | 10.5 | 82.1 |
| 19 | zinc acetyl acetonate | 3.28 | 6.5 | 87.4 |
| 20 | zinc bis-(dimethylaminoethoxide) | 4.82 | 5.0 | 84.9 |
| 21 | diethyl zinc | 2.40 | 5.5 | 85.7 |
| 22 | zinc dimethyldithiocarbamate | 6.10 | 9.0 | 75.9 |

EXAMPLE 23

172.0 g of methyl acrylate, 44.5 g of dimethylaminosame apparatus as in Example 1 and the transesterification was carried out in the same manner as in Example 1 to obtain the result as shown in the Table 2.

TABLE 2

| Example | alkylaminoalkanol | reaction time(hr) | product | yield (%) |
|---|---|---|---|---|
| 24 | diethyl aminoethanol | 8.5 | diethyl aminoethyl acrylate | 83.1 |
| 25 | di-n-hexyl aminoethanol | 10.5 | di-n-hexyl aminoethyl acrylate | 79.7 |
| 26 | dimethyl aminopropanol | 9.0 | dimethyl aminopropyl acrylate | 82.5 |
| 27 | dimethyl aminoisopropanol | 13.0 | dimethyl aminoisopropyl acrylate | 81.0 |

EXAMPLE 28

150 g of ethyl acrylate, 44.5 g of dimethyl aminoethanol, 0.36 g of phenothiazine and 2.9 g of basic zinc carbonate were placed in the same apparatus as in Example 1. The reaction was carried out at a temperature of 102° to 118°C. After 8.5 hours of transesterification, during which the ethanol-ethyl acrylate azeotropic mixture distilled off from the distillation column was removed at a top temperature of 76°–79°C, the distillation under a reduced pressure gave 60.5 g of dimethyl aminoethyl acrylate. It corresponded to a yield of 84.5 %.

CONTROL 1

129.0 g of methyl acrylate, 44.5 g of dimethyl aminoethanol, 0.52 g of phenothiazine and 0.54 g of sodium methylate were placed in the same apparatus as described in Example 1. The methanol-methyl acrylate azeotropic mixture was distilled off at a top temperature of 61° to 63°C for 3 hours in the same manner as in Example 1 and the product was analyzed by the GC method and the NMR method. While the conversion of dimethyl aminoethanol was 93.4 %, the amount of dimethyl aminoethyl acrylate formed was only 29.2 g (Yield : 40.8 % referred to the alcohol) together with 39.1 g of dimethyl aminoethoxy propionic acid methyl ester (44.4 % referred to the alcohol) and 23.0 g of methoxy propionic acid methyl ester as by-products.

CONTROL 2

129.0 g of methyl acrylate, 44.5 g of dimethyl aminoethanol, 0.52 g of phenothiazine and 2.0 g of calcium oxide were placed in the same apparatus as described in Example 1. The reaction was carried out for 4 hours in the same manner as in Example 1. According to the analysis of reaction product, the conversion of dimethylaminoethanol was 52.6% and the amount of dimethylaminoethyl acrylate was 16.5 g (Field: 23.0% referred to the alcohol) together with 22.1 g of dimethylaminoethoxy propionic acid methyl ester (25.3% referred to the alcohol) and the polymer as by-products.

In the same manner as described above except that the reaction was continued for 10 hours, the conversion of dimethylaminoethanol was 97.8 % and the amount of dimethylaminoethyl acrylate was 31.4 g (Yield : 43.9 % referred to the alcohol) together with 31.3 g of dimethylaminoethoxy propionic acid methyl ester (35.8 % referred to the alcohol) and 33 g of polymer as by-products.

CONTROL 3

129.0 g of methyl acrylate, 44.5 g of dimethyl aminoethanol, 0.52 g of phenothiazine and 4.91 g of manganese acetate were placed in the same apparatus as described in Example 1. The reaction was carried out for 10 hours in the same manner as in Example 1. According to the result from the analysis of reaction product, the amount of dimethyl aminoethyl acrylate was only 18.7 g (Yield : 26.2 % referred to the alcohol) together with dimethyl aminoethoxy propionic acid methyl ester and the polymer of methyl acrylate as by-products (33 g).

CONTROL 4

In the process as described in Control 3, 2.67 g of aluminum chloride was used instead of manganese acetate and the reaction was carried out for 10 hours. According to the result from the analysis of reaction product, the amount of dimethyl aminoethyl acrylate was only 22.6 g (Yield : 31.6 % referred to the alcohol) together with dimethyl aminoethoxy propionic acid methyl ester and the polymer of methyl acrylate as by-products (41 g).

CONTROL 5

In the process as described in Control 3, 5.3 g of cadmium acetate was used instead of manganese acetate and the reaction was carried out for 10 hours. According to the result from the analysis of reaction product, the amount of dimethyl aminoethyl acrylate was 28.3 g (Yield : 39.5 % referred to the alcohol) together with 36.4 g of dimethyl aminoethoxy propionic acid methyl ester (41.5 % referred to the alcohol) and the polymer as by-products.

CONTROL 6

In the process as described in Control 3, 5.0 g of titanium tetrabutoxide was used instead of manganese acetate. When mixed with raw materials, titanium tetrabutoxide reacted with water present in the reaction mixtures to make it muddy. The reaction was carried out for 3.5 hours in the manner as in Example 1.

According to the result from the analysis of reaction product, the amount of dimethylaminoethyl acrylate was 15.6 g (Yield : 21.8 % referred to the alcohol).

What is claimed is:

1. A process for the manufacture of alkyl aminoalkyl acrylates of the general formula:

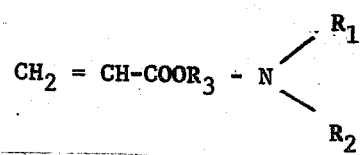

wherein $R_1$ represents hydrogen atom or alkyl group containing 1 to 8 carbon atoms, $R_2$ represents alkyl group containing 1 to 8 carbon atoms, in case of $R_1$ being hydrogen atom, $R_2$ represents tert-alkyl group containing 4 to 8 carbon atoms and $R_3$ represents straight or branched alkylene group containing 2 to 4 carbon atoms comprising reacting an alkyl acrylate of the general formula:

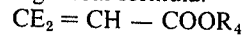

wherein $R_4$ represents alkyl group containing 1 to 4 carbon atoms with an alkyl aminoalkanol of the general formula:

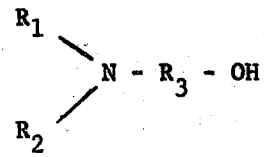

wherein $R_1$, $R_2$ and $R_3$ have the same meanings as mentioned above, in the presence of a catalytic amount of a zinc compound selected from the group consisting of metallic zinc, zinc oxide, hydroxide and sulfide, inorganic and organic acid salts of zinc, alkyl zinc, zinc alkoxides, zinc chelate compounds, and zinc carbamates.

2. A process according to claim 1 wherein the amount of said zinc compound is 0.01 to 30 mol% to said alkyl aminoalkanol.

3. A process according to claim 1 wherein the amount of said zinc compound is 0.05 to 20 mol% to said alkyl aminoalkanol.

4. A process according to claim 1 wherein the reaction temperature is 30° to 170°C.

5. A process according to claim 1 wherein the reaction temperature is 40° to 130°C.

6. A process according to claim 1 wherein said zinc compound is an inorganic acid salt.

7. A process according to claim 1 wherein said zinc compound is zinc hydroxide.

8. A process according to claim 1 wherein said zinc compound is an organic acid salt.

9. A process according to claim 1 wherein said zinc compound is an alkyl zinc.

10. A process according to claim 1 wherein said zinc compound is a zinc alkoxide.

11. A process according to claim 1 wherein said zinc compound is a zinc chelate compound.

12. A process according to claim 6 wherein said inorganic acid salt is one member selected from the group consisting of zinc halide, nitrate, sulfate, phosphate, carbonate, cyanide, thiocyanide, borate, iodate, silicate, chromate, aluminate, tungstate, titanate and heteropolyacid salt.

13. A process according to claim 6 wherein said inorganic acid salt is zinc halide.

14. A process according to claim 6 wherein said inorganic acid salt is zinc carbonate.

15. A process according to claim 6 wherein said inorganic acid salt is basic zinc carbonate.

16. A process according to claim 13 wherein said zinc halide is used as an adduct with said alkyl aminoalkanol.

17. A process according to claim 12 wherein said nitrate is used as an adduct with said alkyl aminoalkanol.

18. A process according to claim 8 wherein said organic acid salt is one member selected from the group consisting of aliphatic carboxylate, naphthenate, aromatic carboxylate, aromatic sulfonate and hydroxy acid salt.

19. A process according to claim 18 wherein said aliphatic carboxylate is one member selected from the group consisting of formate, acetate, propionate, butyrate, octate, stearate, oxalate, succinate, and acrylate.

20. A process according to claim 9 wherein said alkyl zinc has alkyl group containing 1 to 4 carbon atoms.

21. A process according to claim 10 wherein said zinc alkoxide is an alkoxide having alkoxy group containing 1 to 8 carbon atoms or its complex.

22. A process according to claim 11 wherein said chelate compound is zinc acetylacetonate.

23. A process according to claim 1 said alkyl acrylate is used in an amount of 0.5 to 20 mols per mol of said alkyl aminoalkanol.

24. A process according to claim 1 wherein said alkyl acrylate is used in an amount of 1.2 to 6 mols per mol of said alkyl aminoalkanol.

25. A process according to claim 1 wherein said alkyl aminoalkanol is alkyl aminoethanol.

26. A process according to claim 1 wherein said alkyl aminoalkanol is alkyl aminopropanol.

27. A process according to claim 1 wherein said alkyl aminoalkanol is alkyl aminoisopropanol.

28. A process according to claim 25 wherein said alkyl aminoethanol is dimethyl aminoethanol.

29. A process according to claim 25 wherein said alkyl aminoethanol is diethyl aminoethanol.

30. A process according to claim 1 wherein the reaction is carried out in the presence of polymerization inhibitor in an amount of 0.001 to 5 % by weight to said lower alkyl acrylate.

* * * * *